United States Patent [19]
Blacklidge et al.

[11] Patent Number: 5,503,871
[45] Date of Patent: *Apr. 2, 1996

[54] METHOD FOR SEALING AND PRIMING PREPARED SUBSTRATES FOR ROADWAYS AND SUBSTRATE THEREOF

[75] Inventors: Ronald W. Blacklidge; Timothy D. Rayburn, both of Gulfport, Miss.

[73] Assignee: Blacklidge Emulsions, Inc., Gulfport, Miss.

[ * ] Notice: The term of this patent shall not extend beyond the expiration date of Pat. No. 5,449,101.

[21] Appl. No.: 215,299

[22] Filed: Mar. 21, 1994

Related U.S. Application Data

[63] Continuation-in-part of Ser. No. 767,739, Sep. 30, 1991, Pat. No. 5,296,264.

[51] Int. Cl.$^6$ .................................................. B05D 5/10
[52] U.S. Cl. .................. 427/138; 427/385.5; 427/393.6; 428/489; 106/277; 106/278
[58] Field of Search .................................. 427/138, 385.5, 427/393.6; 428/489; 106/277, 278

[56] References Cited

U.S. PATENT DOCUMENTS

| | | | |
|---|---|---|---|
| 2,229,872 | 1/1941 | Pullar | 94/23 |
| 2,646,361 | 7/1953 | Restler | 106/233 |
| 2,706,688 | 4/1955 | Sommer et al. | 106/83 |
| 2,851,824 | 9/1958 | Campbell | 47/58 |
| 2,927,402 | 3/1960 | Goren et al. | 47/58 |
| 3,162,101 | 12/1964 | Rostler | 94/23 |
| 3,297,617 | 1/1967 | Regenstein, Jr. et al. | 268/29.6 |
| 3,336,146 | 8/1967 | Henschel | 106/277 |
| 3,404,108 | 10/1968 | Regenstein, Jr. et al. | 268/29.6 |
| 3,432,321 | 3/1969 | Rostler | 106/277 |
| 3,703,393 | 11/1972 | Koons | 106/279 |
| 4,094,696 | 6/1978 | Burris | 106/277 |
| 4,236,951 | 12/1980 | Krchma et al. | 156/71 |
| 4,405,375 | 9/1983 | Gibson et al. | 106/277 |
| 4,437,896 | 3/1984 | Partanen | 106/277 |
| 4,561,905 | 12/1985 | Kittle | 134/25.1 |
| 4,571,116 | 2/1986 | Patil et al. | 404/76 |
| 4,878,950 | 11/1989 | Halasz et al. | 106/273.1 |
| 5,296,264 | 3/1994 | Blacklidge et al. | 427/138 |

FOREIGN PATENT DOCUMENTS

| | | |
|---|---|---|
| 519468 | 8/1976 | U.S.S.R. . |
| 916526 | 12/1977 | U.S.S.R. . |
| 918444 | 4/1982 | U.S.S.R. . |

OTHER PUBLICATIONS

*Standard Specifications for Transportation Materials and Methods of Sampling and Testing*, American Association of State Highway and Transportation Officials (AASHTO) (1990), pp. viii–xiii, 5, 71–74, 125–126, 145–146, 421, 456–457, 478 and 807–808 (mo unavailable).
*Standard Specifications for Road and Bridge Construction*, Department of Transportation—Florida (1986), pp. iii–viii, 228–236 and 626–635. (mo unavailable).
*Standard Specifications for Road and Bridge Construction*, Department of Transportation—Illinois (1988), pp. iii–vi, 172–196 and 682–697. (mo unavailable).
*Standard Specifications for Road and Bridge Construction*, Department of Highways—Kentucky (1988), pp. v–viii, 179, 182–183, 185, 189–190, 240–250 and 651–658. (mo unavailable).
*Standard Specifications for Roads and Bridges*, Department of Transportation and Development—Louisiana (1982), pp. iii–v, 161–165 and 474–484. (mo unavailable).
*Standard Specifications for Road and Bridge Construction*, State Highway Commission—Mississippi (1990), pp. i–xi, 101-1–101-13, 405-5–405-8 and 702-1–702-7. (mo unavailable).
*Standard Specifications for Highway Construction*, Department of Transportation—Oklahoma (1988), pp. i–ix, 3–11, 134–141, 145–153, 157–163 and 394–405. (mo unavailable).
*Standard Specifications for Highway Construction*, State Highway Department—South Carolina (1986), pp. i–xxi, 135, 140, 146–147, 150–151, 156–167, 200, 217–221 and 238–247 (mo unavailable).
Materials from EXXON Specialty Products dated Sep. 4, 1991, regarding Flexon Product Specifications.
Materials from Texaco—Lubricants Division dated Mar. 1, 1991, regarding Code 2202 Textract Specifications.
Shellflex Oils, Technical Bulletin Shell Oil Company SOC:506–89. (mo & yr unavailable).
Chemical Abstract #64742–04–7.
Brochure from: Dust Allayers, Inc., 270 Park Avenue East, Mansfield, Ohio 44902. (mo & yr unavailable).
*Paint–Coatings Dictionary*, Definitions Committee of the Federation of Societies for Coating Technology, (1978), pp. 38, 39, 59, 64, 163, 202, 354, 416, 441, 476, 551, 552, 574, 600, and 601. (mo unavailable).
*Special Provision for Penetrating Emulsified Prime* Department of Transportation—Illinois (mo & yr unavailable).

*Primary Examiner*—Mark D. Sweet
*Attorney, Agent, or Firm*—Fitch, Even, Tabin & Flannery

[57] ABSTRACT

The present invention provides a method of sealing and priming a prepared substrate, such as a base or sub-base for a roadway, comprising the application of an amount of an emulsion consisting essentially of a first phase of a combination of resinous petroleum oil and an asphalt, a second phase of water, and suitable emulsifiers and stabilizers, where the ratios of the first asphalt and resinous oil phase to the second water phase in the total emulsion are from about a 1:1.8 to 1:11 ratio. The first phase comprises from about 0.3% to 21% asphalt (or equivalent compositions) and from about 3.3% to about 34% resinous petroleum oil (or oils with equivalent properties) based on the total weight of the emulsion. The second phase is of water which provides from about 62.5% to about 91.5% of the total weight of the emulsion. The emulsifiers and stabilizers are from about less than 0.16% to about 2.5% of the total weight of the emulsion. The emulsion may also include about 0.5% to 8% by weight of one or more polymeric additives such as styrene-butadiene rubbers, block polymers or other polymers capable of incorporation in the emulsion. In the amounts used in the invention, those polymers typically increase the durability, flexibility and ductility of the applied and cured emulsion.

16 Claims, No Drawings

5,503,871

METHOD FOR SEALING AND PRIMING PREPARED SUBSTRATES FOR ROADWAYS AND SUBSTRATE THEREOF

This is a continuation-in-part of application Ser. No. 07/767,739 filed Sep. 30, 1991, U.S. Pat. No. 5,296,264.

FIELD OF INVENTION

This invention relates to the surface treatment of prepared substrates, such as roadway base or sub-base courses, including the sealing and priming of the exposed surfaces of the substrates.

BACKGROUND OF THE INVENTION

The construction of a roadway typically requires the preparation of a base or sub-base course which receives and supports one or more layers of pavement materials. A base course may be composed of a variety of materials, such as soil, clay, sand, pulverized shell or the combination of such materials. The base course may also be stabilized with cements, lime-fly ash or other such products, or by mechanical means. The pavement materials applied to the base course to complete the roadway may include one or more layers of hot-mix asphalt, asphalt cement and aggregate, and concrete, among others.

In many instances, before the pavement may be applied to the base course, the surface of the course must be sealed and also frequently primed to receive the pavement materials. A coating of a suitable sealant is employed to ensure that the moisture content of the base course is sufficient to maintain the course in a compacted and stable condition. If this moisture content is not maintained within acceptable limits, the base course may deteriorate over time requiring repair and additional grading prior to placement of the finished pavement.

Similarly, in many applications involving asphaltic pavements, the unpaved earthen surface of the base course must be primed with a suitable material to encourage the fusion or fluxing of the pavement material with the surface of the base course. Insufficient adhesion between the base course and roadway pavement material frequently is the cause of pavement separation and cracking during installation, and subsequent failures and premature deterioration of the pavement surface. Such failures may cause dangerous traffic conditions that require costly repairs.

Cutback asphalts and emulsions of asphalts and water have been used in the past to seal and prime roadway base courses. The asphalt emulsions include products with asphalt residues in a range of from about 30% to 60% or greater by weight of the total product. The cutback asphalts typically include asphalt residues in excess of 60% by weight of the total product combined with solvents such as napthas, kerosenes, oils or other such products to maintain the asphalt in a liquid, flowable condition.

Certain asphalts, asphalt emulsions and bituminous surface treatments may also include latex additives such as unvulcanized styrene-butadiene rubbers, including those compatible with cationic CRS-2 and anionic RS-2 products (see e.g., Specifications M140-88 and M208-87, Standard Specifications for Transportation Materials and Methods of Sampling and Testing, American Association of State Highway and Transportation Officials, 15th Edition (1990)). Such latex additives enhance the durability, flexibility, ductility and adhesion of those products.

A number of difficulties, however, limit the utility of the prior art sealing and priming methods. A relatively thick coat of both the cutback asphalts and the asphalt emulsions is normally required to provide an effective sealer coat on a base course, and such products require relatively long cure times (as long as 2 to 7 days or more) before traffic may be permitted to pass over the treated area. In many states, the prior art sealers must further be covered with sand, fines, a protective layer of sand bituminous mixture or with pavement materials during the curing process to prevent damage to the sealer and pick up of the sealer by vehicular traffic passing over the sealed surface. Both the extended cure time and the necessary application of a cover layer significantly increase the cost and the difficulty of using such products.

Moreover, the tendency of asphalt sealers to adhere to the tires and wheels of vehicles passing over the sealed surfaces frequently results in the loss of the prior art sealer coatings on entire sections of the base course. This loss of portions of the sealed surface substantially interferes with the ability of the prior art coatings to seal and prime the surface of the base course. As a result, multiple applications of such asphalt sealers are often required to repair the sealed surface.

The use of cutback asphalts and asphalt emulsions, in addition, may require equipment adapted to maintain those products at an elevated temperature throughout the application procedure. Such equipment is often expensive to operate and difficult to maintain. Furthermore, as the cutback asphalts and some asphalt emulsions cure, solvents that have been proven to damage the environment are released into the atmosphere. As a result, such products are, or will be, prohibited from general usage in many states. The prior art asphaltic products are also frequently sensitive to alkali and other soil conditions which prevent the product from properly adhering to the base course.

Petroleum products containing asphalt or asphalt derivatives have also been used as dust palliatives, i.e. a treatment to reduce airborne soil particles and soil erosion. These include resinous petroleum oil fractions that are applied to deeply penetrate unpaved roadway surfaces and other exposed soil surfaces. These dust palliatives are formulated to coat individual dust particles, to the extent possible, and to bind the soil particles together without the formation of a substantial surface coating or crust. Such crusts or coatings typically crack, separate or disintegrate with exposure to the elements to release fugitive dust and permit undesirable erosion. As a result, dust palliatives are normally applied at a rate and concentration adjusted to achieve the maximum long term penetration and to minimize the formation of crusts or coatings by the palliative.

Examples of dust palliatives of resinous petroleum oils include those discussed in U.S. Pat. No. 2,646,361, and those sold under the "Coherex" tradename. Other such products have been sold by Blacklidge Emulsions, Inc., Gulfport, Miss., and Dust Allayers, Incorporated, Mansfield, Ohio, under the tradename "Dust Bond" and by Shell Oil Company under the tradename "Shellflex Oils".

Another dust palliative comprises a combination of resinous petroleum oil fractions and an asphalt in a highly diluted emulsion, i.e. one part oil and asphalt in about 6 to 15 parts water. Such products include "Dust Bond Dark" supplied by Dust Allayers, Incorporated and "EPR-1 Prime" supplied by Blacklidge Emulsions, Inc. These products were applied at dilutions and rates to encourage their penetration into an exposed soil surface to prevent soil erosion and the creation of fugitive dust.

SUMMARY OF THE INVENTION

The present invention provides a method of sealing and priming a prepared substrate, such as a base or sub-base for a roadway, comprising the application of an amount of an emulsion consisting essentially of a first phase of a combination of resinous petroleum oil and an asphalt, a second phase of water, and suitable emulsifiers and stabilizers, effective to seal and prime the substrate. The first phase comprises from about 0.3% to 21% asphalt (or equivalent compositions) and from about 3.3% to about 34% resinous petroleum oil (or oils with equivalent properties) based on the total weight of the emulsion. The second phase is of water which provides from about 62.5% to about 91.5% of the total weight of the emulsion. The emulsifiers and stabilizers are from about less than 0.16% to about 2.5% of the total weight of the emulsion.

The contemplated ratios of the first asphalt and resinous oil phase to the second water phase in the total emulsion applied to the base course are from about a 1:1.8 to 1:11 ratio in the total emulsion. The emulsion may also include about 0.5% to 8% by weight of one or more polymeric additives such as styrene-butadiene rubbers, block polymers or other polymers capable of incorporation in the emulsion. In the amounts used in the invention, those polymers typically increase the durability, flexibility and ductility of the applied and cured emulsion.

The asphalts used in the preferred method include those with a viscosity at 60 degrees centigrade preferably of about 400 poise to about 4800 poise, and may include asphalts (or equivalents) with a greater or lesser viscosity having an actual or adjusted viscosity suitable for use in the method of the invention. The resinous oils include paraffinic and napthenic petroleum oil fractions, as well as rubber extender oils and other oils, which when used in the method, have properties equivalent to the resinous oils. The emulsion is applied at a rate of from about approximately 0.1 to 0.5 gal./sq. yd., and preferably from about approximately 0.2 to 0.3 gal./sq. yd.

This method produces sealing and primer coating that may be applied relatively easily, that is both very effective and cost efficient, and that uses readily available materials that may be used cost effectively in large quantities. The sealer coating and primer applied with this method significantly reduces the escape of moisture from the base course and prevents the penetration of undesirable moisture into the treated surface.

Unlike other methods, the invention produces a tough and durable surface coating that cures very rapidly, in as little as 1–8 hours, and resists cracking and separation from the base course. In addition, the properly cured surface of the sealer and primer coat is resistant to damage by vehicle tires and does not require expensive post-application covers of sand, fines or pavement coatings to protect the treated surface from traffic. The invention also does not require the use of heated application appliances or the use of large quantities of energy to maintain the sealer at elevated temperatures during treatment of the base course. Similarly, the method substantially eliminates the need for large volumes of solvents or thinners that endanger the environment when they are released during the curing process.

DETAILED DESCRIPTION OF THE INVENTION

The method of the invention comprises the application of an emulsion of asphalt and resinous petroleum oil to a base or sub-base course for a roadway. Prior to application of the emulsion, the base course is graded and compacted to the proper specifications and the moisture content of the base course is adjusted to a level necessary to obtain optimum compaction of the course. Similarly, unnecessary dust or fine soil apparent on the surface of the prepared course is preferably removed.

The emulsion is preferably prepared prior to application by the dilution with water of a concentrate containing the asphalt, oil and other components such as supplied under the tradename "EPR-1 Prime" by Blacklidge Emulsions, Inc. and Dust Allayers, Incorporated. This concentrate may comprise primarily the first asphalt and oil phase of the final emulsion, as well as an amount of water, emulsifiers and stabilizers. A modified embodiment of such a concentrate further may include polymeric additives, such as styrene-butadiene latex rubbers, block polymers, etc. The final emulsion may also be prepared by other means, such as the direct mixing of its individual components in a central tank prior to or simultaneously with the treatment of the base course, with the application of heat where necessary to aid in the emulsifying process.

The contemplated concentrate used in the preferred embodiment has the following characteristics:

|  | Concentrate Composition | | | |
| --- | --- | --- | --- | --- |
|  | Asphalt And Oil Oil Component (First Phase) | Emulsifiers And Stabilizers | Polymeric Additives | Water |
| Approx. Max. | 70% | 5% | 8% | 29% |
| Approx. Min. | 50% | less than 1% | less than 1% | 25% |
| Preferred Approx. Amounts | 58%–67% | 1%–2% | 1%–5% | 31%–41% |
| Second Preferred Approx. Amounts | 60%–65% | 1%–2% | 2%–3% | 33%–39% |

When the final emulsion is prepared with the preferred concentrate, the contemplated ratio of concentrate to added water in the final emulsion is from about 1:1 to 1:5. Based on present state regulations, the preferred ratio of concentrate to water is from about 1:3 to 1:5, and depending on soil conditions, the preferred ratio is 1:3. If the first asphalt and oil phase exceed the maximums or fall below the minimum amounts as set forth above, the stability of the concentrate, and of the final diluted emulsion as applied to the base course, may be threatened. The components of the concentrate or the final emulsion may clump and separate during storage, and thus become unusable or require expensive and time consuming remixing.

In the above concentrate, the contemplated weight percentage of the asphalt component of the asphalt and oil phase in the concentrates is from about 3% to about 60% of the total weight of the concentrate, and is most preferably about 5%–10% of the total weight of the concentrate. The contemplated weight percentage of the resinous petroleum oil component of that phase of the concentrate is from about 40% to about 97% of the total weight of the concentrate and is most preferably about 45%–60% of the total weight of the concentrate. As mentioned above, the contemplated weight percent of polymeric additives is from about 1% to about 8%, and is preferably about 1% to about 5%, and most preferably about 2%–3% by weight of the concentrate.

From the above, it can be seen that the contemplated weight percentage of each component in the final emulsion, prepared with the preferred concentrate diluted at concentrate to water ratios of about 1:1, about 1:5 and about 1:3, are as follows:

| Mixture | Ratios Of First Asphalt And Oil Phase To Second Water Phase In Final Emulsion | | |
|---|---|---|---|
| | Concentrate To Water Ratio | Percentage First To Second Phase | Ratio First To Second Phase |
| Approx. Max. Of First Asphalt And Oil Phase | 1:1 | 35%:62.5% (approx. 2.5% surfact. and emulsif.) | 1:1.8 |
| Approx. Min. Of First Asphalt And Oil Phase | 1:5 | 8.3%:91.5% (approx. 0.2% surfact. and emulsif.) | 1:11 |
| Preferred Amount Of Conc., Approx. Max. Of First Asphalt And Oil Phase | 1:3 | 17.25:81.9 (approx. 0.85% surfact. and emulsif.) | 1:4.75 |

The above final ratios reflect the components of the first asphalt and oil phase, whether from the preferred concentrate or from any other single or combination of sources. The total water includes that added to prepare the final emulsion, as well as the water present in the preferred concentrate (or any other source) if such a concentrate is used.

| Max. and Min. Amounts of Components | Weight Percentages of Components For Concentrate And Final Emulsions | | | | |
|---|---|---|---|---|---|
| | Concentrate Wt. Perct. | Wt. Perct. First Phase | Wt. Perct. In Final Emulsion At Concen. To Water Ratios of | | |
| | | | 1:1 | 1:3 | 1:5 |
| First Asphalt And Oil Phase: | | | | | |
| Approx. Max. | 70% | — | 35.0% | 17.5% | 11.7% |
| Approx. Min. | 50% | — | 25.0% | 12.5% | 8.3% |
| Asphalt: | | | | | |
| Approx. Max. | — | 60% | 21.0% | 10.5% | 7.0% |
| Approx. Min. | — | 3% | 0.8% | 0.4% | 0.3% |
| Resin. Pet. Oil: | | | | | |
| Approx. Max. | — | 97% | 34.0% | 17.0% | 11.3% |
| Approx. Min. | — | 40% | 10.0% | 5.0% | 3.3% |
| Second Water Phase: | | | | | |
| Approx. Max. | 49% | — | 74.5% | 87.3% | 91.5% |
| Approx. Min. | 25% | — | 62.5% | 81.9% | 87.5% |
| Emulsifiers and Stabilizers: | | | | | |
| Approx. Max. | 5% | — | 2.5% | 0.63% | 0.8% |
| Approx. Min. | <1% | — | <0.5% | <0.25% | <0.16% |
| Polymeric Additives: | | | | | |
| Approx. Max. | 8% | — | 4.0% | 2.0% | 1.33% |
| Approx. Min. | <1% | — | <0.5% | <0.25% | <0.16% |

As shown below, the ratios of first asphalt and oil phase to second water phase for final emulsions with the above compositions which contain an approximate maximum and minimum percentage of the asphalt and oil phase are as follows:

The specific ratio of first asphalt and oil phase to second water phase chosen for a particular application will depend on factors such as the composition of the base course, the number of planned applications, the desired cure time and state regulations. For example, where the base course is of an open grade and granular composition, the preferred concentrate is mixed at a ratio of about 1:3 to 1:5 of concentrate and water to obtain sufficient penetration of the course by the sealer and primer to more effectively bind the loose upper soil surface of the course together.

Where the base course is non-porous, such as those made of clay soils, the ratio of concentrate to water is preferably from about 1:1 to 1:3. Such soils are unlikely to permit the penetration of the surface of the course and increasing the amount of water diluent will typically encourage undesirable pooling of the emulsion on the treated surface. In the preferred method of the invention, deep penetration of the base course is avoided to provide a more effective sealer and primer on the exposed surface of the course. Similarly, in applications where quick curing is desirable, dilution ratios of first phase to second phase of about 1:5 are preferred. These greater dilution ratios produce an emulsion that is relatively thin and cures relatively quickly.

The emulsion of the invention with polymeric additives is particularly suited for prime coats and curing seals that are subjected to vehicular traffic. As mentioned above, the polymeric additives enhance the flexability and ductility of the cured emulsion. In addition, polymeric additives may enhance the durability of the applied emulsion by reducing the effects of oxidation of the components of the emulsion by sunlight and other environmental conditions. The polymeric additives further may enhance the adhesion between the applied emulsion and the underlying substrate.

The emulsion may be applied by hand spreading and through conventional spraying equipment, as well as comparable techniques. An effective amount of the emulsion is normally obtained at a rate of about 0.1 to 0.5 gal./sq. yd. The rate of application of the emulsion, in addition, may vary with the conditions of the base course and other factors. The application rate for very compacted, water-laden soils is typically about 0.1 gal./sq. yd. Based on state regulations, the preferred application rate for typical soil conditions is about 0.1 to 0.3 gal./sq. yd.

The sealer and primer typically cures in about 15 minutes to 8 hours after the emulsion is applied to the exposed surface of the base course, depending on the rate of application, the dilution ratios used, the base course conditions and the weather, among other considerations. If the base course contains excess moisture, the curing time of the emulsion will be increased and penetration of the emulsion into the surface of the course will be delayed. If insufficient moisture is present in the base course, the emulsion may not properly adhere to the treated surface.

It is not necessary in most instances to add sand, fines or other such products to cover and protect the treated surface from traffic damage when properly cured. After the sealer and primer is cured, traffic may be permitted to pass over the roadway, and a paving surface may later be applied to the course. The treated surface, in addition, may be covered with a protective layer of sand, fines or pavement layer if the surface must be exposed to traffic before the sealer coating and primer has fully cured.

The asphalt component of the emulsion preferably includes asphalts of the grades AC-5 to AC-40, most preferably AC-20, and may include asphalt grades in excess of AC-40 or less than AC-5, if those asphalts have an actual or adjusted viscosity suitable for use in the method of the invention. The AC-5 to AC-40 grade asphalts typically have viscosities at 60 degrees centigrade (140 degrees Fahrenheit) from about 400 poise to about 4800 poise, as determined pursuant to AASHTO Procedure 201-90 and 202-90, which correspond to ASTM D2170-81 and ASTM D2171-81, respectively. As used herein, asphalts include compositions of asphaltenes, maltenes or mixtures of asphaltic components which would, if considered separately from the emulsion, possess similar properties to those asphalts described above.

The resinous petroleum oil component of the emulsion may comprise petroleum oil extracts, including paraffinic or napthenic oils, as well as other oils, which when used in the method have properties equivalent to such resinous oils. Typically, such petroleum oils are used as rubber extenders oils and have low asphaltene contents. Examples of such products are discussed in U.S. Pat. No. 2,646,361; and also include "Shellflex" oils supplied by the Shell Oil Company; "Textract" supplied by Texaco Oil Company; "DAI 89 Base Resin" supplied by Dust Allayers, Incorporated; "Hydrolene" asphalt oils supplied by Sun Refining and Marketing Company; as well as similar products.

The resinous oils, and mixtures thereof, preferably have specific gravities approaching 1 and saturates of less than about 25% by weight of the oil. In one preferred embodiment, the resinous petroleum oil was a mixture of about 60% "Hydrolene 90" and about 40% "Hydrolene 125". The reported characteristics of these oils are as follows:

| Hydrolene ® Asphalt Oils | | |
|---|---|---|
| | Hydrolene 90 | Hydrolene 125 |
| Viscosity, 60 C. (104 F.), cSt | 132 | 217 |
| Flash Point, COC, C(F) | 216(420) | 228(445) |
| Rolling Thin-Film Oven Test: | | |
| Viscosity Ratio | 1.20 | 1.20 |
| Weight Change, % | −2.9 | −1.5 |
| Density @ 15 C.(60 F.), Kg/dm$^3$ | 0.9925 | 0.9995 |
| Pounds/Gallon | 8.27 | 8.33 |
| Asphaltenes, Mass % | 0.1 | 0.1 |
| Polar Compound, Mass % | 10.4 | 13.5 |
| Aromatics, Mass % | 73.2 | 70.9 |
| Saturates, Mass % | 16.3 | 15.5 |

In addition, the concentrates of the invention also have been characterized for the purposes of state highway specifications in terms of viscosity, flash points and similar measurements. While such specifications do not necessarily identify the individual components of the concentrate, examples are provided below for the purposes of illustration:

| EPR-1 Prime | | |
|---|---|---|
| | Min. | Max. |
| Tests on Emulsion: | | |
| Saybolt Furol Viscosity at 77° F. (25°C.), sec. | 16 | — |
| Storage Stability 24 hr., % | — | 1.0 |
| Sieve Test, % (a) | — | 0.1 |
| Residue by Evaporation, % (b) | 15 | — |
| Particle Charge Test | Positive | |
| Tests on Residue: | | |
| Flash Point, COC (°F.) | 390 | — |
| Kinematic Viscosity at 140° F. (60° C.) (cst) | 190 | 600 |
| Aniline Point (°F.) | 85 | 150 |

(a) Distilled water shall be used in place of 2% w sodium oleate solution.
(b) Concentrate diluted at 1 part concentrate to 3 parts water; residue is minimum 60% by weight in concentrate.

Such specifications may encompass more than one embodiment of the concentrate of the method. For example, a preferred embodiment of the concentrate comprising about 10% AC-20 grade asphalt; about 53% of a mixture of 60% Hydrolene and 40% Hydrolene 125; about 1.5% of Akzo E-11 emulsifier (cationic) and Akzo 4442 stabilizers; and about 35.5% water would satisfy the above specifications. The specification will also encompass concentrates with greater or lesser amounts of asphalt, resinous oils, polymeric additives and combinations of those and other components falling within the percentage ranges (and their equivalents) previously mentioned for the concentrate of the method.

When polymeric additives are used, preferred additives are latex rubbers of styrene/butadiene compositions, block polymers or other such polymers compatible with the asphalt and resinous petroleum oil components of the emulsions. A preferred polymeric additive includes a styrene/butadiene latex polymer such as that supplied by BASF Corporation, including Butanol NS 198 reportedly comprising about 76% butadiene, about 25% styrene, with a total rubber solids of about 63% by weight. The reported Brookfield viscosity of Butanol NS 198 (RVT Spindle #3, 20 rpm) is about 1600 mPa*s, and the reported specific gravity is about 0.94, with a weight per volume of about 7.8 pounds per gallon (0.94 kilograms per liter). Another preferred styrene/butadiene latex is supplied as UP-65K by the Ultrapave Division, Textile Rubber and Chemical Company, Inc., reportedly comprising about 24% styrene and about 76% butadiene, with a total rubber solids content of about 62% by weight.

A wide variety of emulsifiers and stabilizers may be used to suspend the two phases of the emulsion. These emulsifiers, in addition, may be nonionic, anionic, cationic or a combination of such products. Examples of such products may be found in U.S. Pat. No. 2,646,361. The preferred emulsifiers and stabilizers are those found in the concentrate sold under the tradename "EPR-1 Prime" by Blacklidge Emulsions, Inc. and Dust Allayers, Incorporated. Other preferred emulsifiers include Akzo E-11 and Akzo 4442 supplied by Akzo Chemical Company, Chicago, Illinois.

An emulsion formed by the mixture of the above mentioned components of the first and second phases, emulsifiers and stabilizers in other orders or in different combinations may also be used for the purposes of the invention. For example, each component of asphalt, resinous oil, emulsifier, stabilizer, polymeric additives and water may be added separately, or in any desirable combination, to a central mixing tank. The charged tank may then be agitated and, if necessary, the asphalts, oils and the tank may be heated to ensure proper mixture of the components and the emulsification of the asphalt and oil phase.

EXAMPLES 1-5

Sections of a prepared roadway base course were sprayed using conventional equipment with an emulsion of EPR-1 Prime concentrate supplied by Dust Allayers, Incorporated, and water in the ratios and at the application rates set forth below. The EPR-1 Prime concentrate reportedly comprised about 60% resinous petroleum by weight asphalt and oil, about 5% A-20 grade asphalt, and about 35% by weight water, emulsifiers and stabilizers.

| Example | 1 | 2 | 3 | 4 | 5 |
|---|---|---|---|---|---|
| Ratio Of Concentrate To Water Diluent | 1:3 | 1:2 | 1:6 | 1:5 | 1:3 |
| Application Rate (gal./sq. yd.) | 0.3 | 0.2 | 0.25 (applied twice) | 0.2 | 0.1 |

For examples 1-3, the base course was composed of an open grade lime and fly ash aggregate mixture and the emulsions were applied in mid-afternoon. In each experimental application, the sealer and primer was sufficiently cured in about 2 hours to allow the passage of automobile traffic over the treated surface without loss of surface integrity. The emulsion penetrated the surface of the base course approximately 0.5 to 0.75 inches and left a waxy coat that repelled water.

The sections of base course treated with the base coat and primer of the invention were inspected one day, five days and nineteen days later. At each inspection, the surface of the sealer and primer was lifted and it was observed that the moisture content of the underlying base course had been maintained by the sealer and primer. Damage from construction traffic was negligible, and there was essentially no evidence of adhesion of the sealer and primer to the tires of vehicles.

A control of emulsified asphalt primer EA-1 was also applied to surfaces adjacent the test area. The inspection of the control areas revealed numerous damaged sections where the emulsified asphalt had been penetrated or removed by the vehicular traffic. The surface of the base course in and around the damaged portions had noticeably dried, including areas under the emulsified asphalt primer.

For example 4, the base course was composed of a medium to close grade cement stabilized soil that had previously been cement treated and repulverized. During the observation period, the base coat and primer did not evidence signs of disruption by local traffic passing over the treated sections. A second treatment of the experimental sections was then applied at the same dilution and application rate prior to the installation of the first of the pavement layers to the base course.

A control of emulsified asphalt primer (SS-1 Asphalt Emulsion) was also applied to surfaces adjacent the test area. The inspection of those control areas revealed numerous instances of scabs of bare soil at random locations throughout the control area. Several reapplications of the SS-1 emulsified asphalt primer were required to repair the damaged areas and restore the integrity of the coating.

For example 5, the base course was composed of a close grade limestone soil and the emulsion achieved no observable penetration of the surface of the base course. The sealer and primer were exposed for approximately a week under very light traffic conditions. During the observation period, there were no observable defects or problems with the coating.

Thus, the method of the invention produces a durable and dependable sealer coating and primer for substrates such as roadway base courses that is unexpectedly superior to the prior art sealers. The materials used and the elimination of expensive heating equipment and procedures makes this method cost efficient and practical for use in many applications, including extensive road construction projects. The invention may also be used where similar concerns relating to the sealing of substrates of soils or other such materials are present, or for applications in road building where fluxing of a pavement material to other substrates, such as old pavement surfaces, is required.

While the invention has been described by reference to certain specific descriptions and examples which illustrate preferred materials and conditions it is understood that the invention is not limited thereto. Rather, all alternatives, modifications and equivalents within the scope and spirit of the invention so described are considered to be within the scope of the appended claims.

What is claimed is:

1. A method for sealing the exposed surface of a prepared substrate comprising soil, clay, sand, shell, cement, limestone, fly ash or mixtures thereof, said method comprising the application to said exposed surface of an amount of an emulsion effective to retain moisture within said substrate; said emulsion consisting essentially of a first phase comprising asphaltenes, maltenes and optionally other asphaltic components and a resinous petroleum oil, a second phase of water, and at least one surfactant; wherein the ratio of said first phase to said second phase in said emulsion is from about 1:1.8 to about 1:11.

2. The method of claim 1 wherein the first phase of said emulsion comprises a mixture of asphaltenes, maltenes and other asphaltic components, and a resinous petroleum oil.

3. The method of claim 2 wherein said asphaltenes, maltenes and other asphaltic components of said emulsion comprises about 0.3% to about 21% of the total weight of said emulsion.

4. The method of claim 2 wherein said resinous petroleum oil component of said emulsion comprises from about 3% to about 34% of the total weight of said emulsion.

5. The method of claim 2 wherein said emulsion is prepared by the dilution with water of a concentrate comprising said asphaltenes, maltenes and other asphaltic components and said resinous petroleum oil.

6. The method of claim 5 wherein said concentrate comprises a first phase of said asphaltenes, maltenes and other asphaltic components and resinous oil phase and a second phase of water, said first phase being from about 50% to about 70% by weight of said concentrate.

7. The method of claim 6 wherein said first phase comprises from about 3% to about 60% of said asphaltenes, maltenes and other asphaltic components.

8. The method of claim 1 wherein said emulsion is applied to said prepared substrate at about 0.10 to about 0.5 gallons per square yard.

9. The method of claim 1 wherein said emulsion is applied to said prepared substrate at about 0.1 to about 0.3 gallons per square yard.

10. A method for priming the exposed surface of a graded and compacted roadway base course to receive a layer of asphaltic roadway material comprising the application to said exposed surface an amount of an emulsion effective to prepare said base course to receive said layer of asphaltic roadway material; said emulsion consisting essentially of a first phase of an asphalt and a resinous petroleum oil, a second phase of water, and at least one surfactant; wherein the ratio of said first phase to said second phase in said emulsion is from about 1:1.8 to about 1:11.

11. The method of claim 10 wherein said emulsion consists essentially of a first phase of an asphalt and a resinous petroleum, and a second phase of water, at least one surfactant and at least one polymer compatible with said asphalt and resinous petroleum phase.

12. A method for sealing the exposed surface of a prepared substrate comprising soil, clay, sand, shell, cement, limestone, fly ash, and mixtures thereof, said method comprising the application to said surface of an amount of an emulsion effective to retain moisture within said substrate; said emulsion consisting essentially of a first phase of an asphalt and a resinous petroleum oil, a second phase of water, at least one surfactant and at least one polymer compatible with said asphalt and resinous petroleum oil.

13. The method of claim 12 wherein said polymer comprises from less than 2% to about 4% by weight of the emulsion.

14. The method of claim 13 wherein said polymer comprises a styrene-butadiene rubber.

15. The method of claim 13 wherein the said polymer is a block polymer.

16. A prepared traffic bearing composite comprising a base of soil, clay, sand, shell, cement, limestone, fly ash or mixtures thereof; a first layer comprising asphalt and resinous petroleum oil in intimate contact with said base, said first layer formed by the deposition of an emulsion consisting essentially of an asphalt and resinous petroleum oil phase and a water phase, wherein the ratio of said asphalt and resinous petroleum oil phase to said water phase in said emulsion is from about 1:1.8 to about 1:11; and a second layer of asphaltic paving material in intimate contact with said first layer of asphalt and resinous petroleum oil.

* * * * *

UNITED STATES PATENT AND TRADEMARK OFFICE
CERTIFICATE OF CORRECTION

PATENT NO. : 5,503,871
DATED      : April 2, 1996
INVENTOR(S): Ronald W. Blacklidge and Timothy D. Rayburn It is certified that error appears in the above-indentified patent and that said Letters Patent is hereby corrected as shown below:

On the title page:

In [*] Notice: delete "5,296,264" and insert --5,503,871--.

Signed and Sealed this

Tenth Day of December, 1996

Attest:

BRUCE LEHMAN

*Attesting Officer*     *Commissioner of Patents and Trademarks*